(12) United States Patent
Schieke et al.

(10) Patent No.: US 12,030,130 B2
(45) Date of Patent: Jul. 9, 2024

(54) METHOD FOR MACHINING THE TIP CIRCLE DIAMETER AND A TOOL FOR PRODUCING A GEARWHEEL

(71) Applicant: Präwema Antriebstechnik GmbH, Eschwege/Werra (DE)

(72) Inventors: Jörg Schieke, Erfurt-Marbach (DE); Jörg Reinhardt, Berka v.d.H. (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 0 days.

(21) Appl. No.: 17/245,775

(22) Filed: Apr. 30, 2021

(65) Prior Publication Data

US 2021/0339323 A1 Nov. 4, 2021

(30) Foreign Application Priority Data

Apr. 30, 2020 (DE) .................... 10 2020 111 838.4

(51) Int. Cl.
 *B23F 17/00* (2006.01)
 *B23F 5/16* (2006.01)
 (Continued)

(52) U.S. Cl.
 CPC ............ *B23F 17/006* (2013.01); *B23F 5/163* (2013.01); *B23F 5/202* (2013.01); *B23F 5/205* (2013.01);
 (Continued)

(58) Field of Classification Search
 CPC ...... B23F 5/163; B23F 17/006; B23F 21/005; Y10T 29/5176; Y10T 409/10–109699
 (Continued)

(56) References Cited

U.S. PATENT DOCUMENTS 3,931,754 A * 1/1976 Nishijima ............. B23F 21/005
                                                   409/35
9,782,848 B2   10/2017 Stadtfeld et al.
(Continued)

FOREIGN PATENT DOCUMENTS

CN        105246631 A     1/2016
CN        107530801 A     1/2018
(Continued)

OTHER PUBLICATIONS

International Standard: ISO 1122-1:1998—Vocabulary of Gear Terms—Part 1: Definitions Related to Geometry, Second edition, Aug. 1, 1998.*

*Primary Examiner* — Erica E Cadugan
(74) *Attorney, Agent, or Firm* — The Webb Law Firm (57) ABSTRACT

The invention relates to a method for machining the tip circle diameter of a tooth system (4) of a gearwheel (6), in which the gearwheel (6) rotates about a workpiece axis of rotation (Rw), and in which at least one tooth (9) of the tooth system (4) is machined, by removing chips, by means of a tool (7, 7') that rotates about a tool axis of rotation (Rz) oriented at an axial distance (A', A") relative to the workpiece axis of rotation (Rw). According to the invention, the tool (7, 7') is disk-shaped, the disk-shaped tool (7, 7') machines the tip surface (8) of the tooth (9), by removing chips, with at least one partial segment (10a) of its circumferential edge configured as a defined blade (10), wherein a relative movement between the tool (7, 7') and the gearwheel (6), oriented in the axial direction of the tooth system (4), is carried out during the chip-removing machining, as a consequence of which movement the tool (7, 7') sweeps over the tip surface (8), and the tool axis of rotation (Rz) is oriented at an axis intersection angle ($\Sigma''$) of 5° to 40° with respect to the workpiece axis of rotation (Rw). In this way, efficient and highly precise machining of the tip circle diameter is (Continued)

made possible. The invention also states a method for producing a gearwheel, in which the tooth system (4) is produced on a gearwheel blank (5) by means of hob peeling before machining of the tip circle diameter according to the invention, as well as a combination tool, in which a hob-peeling wheel for producing the gearwheel and a disk-shaped tool for machining the tip circle diameter according to the invention are combined with each other.

14 Claims, 4 Drawing Sheets (51) Int. Cl.
  *B23F 5/20* (2006.01)
  *B23F 5/22* (2006.01)
  *B23F 19/00* (2006.01)
  *B23F 21/00* (2006.01)
(52) U.S. Cl.
  CPC ............... *B23F 5/22* (2013.01); *B23F 19/00* (2013.01); *B23F 21/005* (2013.01); *Y10T 29/5176* (2015.01); *Y10T 409/10795* (2015.01); *Y10T 409/108586* (2015.01); *Y10T 409/108904* (2015.01)
(58) Field of Classification Search
  USPC .......................................... 29/56.5; 409/1–62
  See application file for complete search history.

(56) References Cited

U.S. PATENT DOCUMENTS

| | | | |
|---|---|---|---|
| 10,610,940 | B2 | 4/2020 | Prock |
| 10,894,293 | B2 | 1/2021 | Zimmerman |
| 11,097,364 | B2 | 8/2021 | Schaferling et al. |
| 2006/0174464 | A1* | 8/2006 | Fitzgerald ............. B23Q 1/623 29/56.5 |
| 2011/0268523 | A1* | 11/2011 | Heinemann ............ B23F 5/163 409/20 |
| 2017/0072485 | A1* | 3/2017 | Weppelmann .......... B23F 5/163 |
| 2018/0079019 | A1* | 3/2018 | Heyn .................... B23F 17/006 |
| 2018/0111209 | A1* | 4/2018 | Prock ..................... B23F 5/163 |
| 2018/0117691 | A1 | 5/2018 | Buchholz et al. |
| 2019/0054554 | A1* | 2/2019 | Sobczyk ................ B23F 5/163 |
| 2020/0171591 | A1* | 6/2020 | Weppelmann ........ B23F 21/005 |
| 2023/0264280 | A1* | 8/2023 | Kreschel ................ B23F 5/163 409/293 |

FOREIGN PATENT DOCUMENTS

| | | |
|---|---|---|
| CN | 110121393 A | 8/2019 |
| DE | 102015106354 A1 | 6/2016 |
| DE | 102015104242 A1 | 9/2016 |
| DE | 102015104500 A1 | 9/2016 |
| EP | 1577042 A1 | 9/2005 |
| EP | 2520391 A1 | 11/2012 |
| EP | 2537616 A1 | 12/2012 |
| WO | 2010075600 A1 | 7/2010 |

* cited by examiner

METHOD FOR MACHINING THE TIP CIRCLE DIAMETER AND A TOOL FOR PRODUCING A GEARWHEEL

CROSS-REFERENCE TO RELATED APPLICATION

This application claims priority to German Patent Application No. 102020111838.4 filed Apr. 30, 2020, the disclosure of which is hereby incorporated by reference in its entirety.

BACKGROUND OF THE INVENTION

1. Field of the Invention

The invention relates to a method for machining the tip circle diameter of the tooth system of a gearwheel, in which a gearwheel provided with the tooth system is driven to rotate about a workpiece axis of rotation, and in which at least one tooth of the tooth system of the gearwheel is machined by means of a tool, by removing chips, which tool rotates about a tool axis of rotation oriented at an axial distance from the workpiece axis of rotation.

2. Discussion of the Related Art

A method of this type is known from DE 10 2015 104 242 A1. In the known method, a combination tool is used, in which a tooth machining tool and a peeling wheel are firmly connected to each other. The combination tool is clamped in a tool spindle and rotates about a tool axis of rotation during machining. In a first step, a tooth system is introduced into a gearwheel blank driven to rotate by a workpiece spindle, in synchronous running with the tool, by means of hob peeling using the peeling wheel of the combination tool, wherein the workpiece spindle and the tool spindle stand at an axis intersection angle relative to one another, and advancing takes place in the direction of the tooth flank expanse. In a second step, at least some of the teeth of the tooth system of the gearwheel that was previously produced from the blank are machined, using the tooth machining tool, by means of removing chips. The two machining steps thus take place in one clamped position. Therefore, the combination tool remains clamped in the tool spindle, and the worked gearwheel remains clamped in the workpiece spindle. Only the relative position of the tool spindle with respect to the workpiece spindle and the speed of rotation ratio of the two spindles are adapted to the corresponding machining operation. The production of shadings or pocket grooves as well as general milling or drilling machining are mentioned in DE 10 2015 104 242 A1 as examples of the tooth machining that takes place in the second step of the known method.

A comprehensive presentation of the influence variables that must be taken into consideration in the production and machining of gearwheels by means of hob peeling is found in EP 2 520 391 A1. A method and an apparatus for hob peeling a workpiece that has a rotation-symmetrical, periodic structure, using a hob-peeling tool, are described in this publication. According to this prior art, a coupled relative movement of the hob-peeling tool with respect to the workpiece is carried out during hob peeling. Accordingly, the hob-peeling tool is rotated about a first axis of rotation, while the workpiece is rotated about a second axis of rotation. During this process, the tool and the workpiece preferably rotate in opposite directions, i.e., the direction of rotation of the hob-peeling tool is directed counter to the direction of rotation of the workpiece. At the same time, an inclination angle is set during hob peeling, which is greater than 15 degrees, in terms of amount, and the first axis of rotation is oriented askew with respect to the second axis of rotation.

An important machining operation, in particular in the case of gearwheels on which a profile displacement has been undertaken, is machining of the tip circle diameter. This is carried out so as to impart sufficient width to the teeth of a gearwheel in the region of its tooth head, and, in this manner to prevent the tooth material from breaking out as the result of local stress that might occur otherwise. Machining of the tip circle diameter is usually performed as lathing machining in practice. For this purpose, the gearwheels are usually subjected to lathing machining in current operational practice, after they have been formed from a gearwheel blank by means of hob peeling, in accordance with the examples from the prior art as explained above.

Against the background of the prior art as explained above, the task arose of indicating a method with which the tip circle diameter of a gearwheel can be machined efficiently and with great precision.

A tool for producing a gearwheel should also be created, with which such precise and efficient production of a gearwheel can be accomplished.

SUMMARY OF THE INVENTION

The invention accomplished this task by means of the method of the invention. A tool that accomplishes the aforementioned task according to the invention is described herein.

Advantageous embodiments of the invention will be explained in detail below, as will the general idea of the invention.

In a method according to the invention for machining the tip circle diameter of a tooth system of a gearwheel, the gearwheel provided with the tooth system is therefore driven to rotate about a workpiece axis of rotation, in accordance with the prior art explained initially above, and at least one tooth of the tooth system of the gearwheel is machined by means of a tool, by removing chips, which tool rotates about a tool axis of rotation oriented at an axial distance from the workpiece axis of rotation.

According to the invention, the tool is now disk-shaped, wherein the disk-shaped tool machines the tip surface of the tooth to be machined, in each instance, by removing chips, at least with one partial segment of its circumferential edge that is configured as a defined blade, wherein a relative movement, oriented in the axial direction of the tooth system, between the tool and the gearwheel is carried out during the chip-removing machining, as the result of which movement the tool sweeps over the tip surface to be machined, and wherein the tool axis of rotation is oriented, with respect to the workpiece axis of rotation, at an axis intersection angle of 5° to 40°.

Here, the invention is based on the finding that the tip circle diameter of a gearwheel can be machined in a time-saving manner and with great production precision using a disk-shaped tool, which is brought into chip-removing engagement, in the manner of hob peeling, at a specific intersection angle, with the tip surface of each tooth to be machined, which tip surface is decisive for the desired changes in the tip circle diameter.

In the method according to the invention, the disk-shaped tool used according to the invention removes material from the tip surface of the tooth in question using the defined blade configured on its circumference, in each instance, as the result of the relative movement of the workpiece and the tool. In this process, the material removal begins proceeding from a starting position, in which the tool blade dips into the material of the tooth, and ends, in accordance with the axial relative displacement that the tool and the gearwheel experience during a machining pass, in an end position in which the tool exits from the material of the tooth.

The relative movement between the gearwheel and the disk-shaped tool, which is performed during the chip-removing movement, can be brought about by axially moving the disk-shaped tool along its tool axis of rotation from a starting position that is assigned to a first end face of the gearwheel, toward the second end face of the gearwheel. Alternatively, the relative movement between the gearwheel and the disk-shaped tool can also be brought about, during the chip-removing movement, by axially moving the gearwheel along its workpiece axis of rotation from a starting position that is assigned to a first end face of the disk-shaped tool toward the second end face of the disk-shaped tool. In this regard, obviously it is also possible for the gearwheel to be moved along its workpiece axis of rotation as well as for the disk-shaped tool to be moved along its tool axis of rotation. Depending on the movement axes available in the machine in question, it can prove to be particularly advantageous, from a machine technology point of view, if the gearwheel is moved in the axial direction of its axis of rotation, while the tool does not perform any axial movement. This particularly proves to be advantageous if the gearwheel to be machined is a gearwheel with an internal tooth system, which is held in a stable workpiece holder that can be displaced in the axial direction of the workpiece axis of rotation.

The invention thereby makes use of the kinematics of hob peeling, but for this purpose does not use a tool adapted to the shape of the tooth system, but rather a disk-shaped tool that allows planar, chip-removing material removal from the tip surface of the tooth to be machined, in each instance.

The material removal achieved according to the invention on the tooth that was machined, in each instance, is dependent on the axis intersection angle. Here, the invention provides for an axis intersection angle of at least 5°. In this regard, axis intersection angles of at least 10° have particularly proven themselves in practice, from a production technology point of view. At the same time, excess stresses on the disk-shaped tool, in the region of the blade that is configured on its circumferential edge, are prevented due to the fact that the axis intersection angle is restricted, according to the invention, to at most 40°. This stress can be prevented, in particularly reliable manner, by restricting the axis intersection angle to at most 35°.

If all of the teeth of the gearwheel to be machined are to be machined uniformly, in a manner according to the invention use can be made of a disk-shaped tool whose circumferential edge, bringing about the chip-removing material removal is configured as a defined blade over its entire circumference length.

If, in contrast, only specific teeth are to be machined on the tip surface, partial segments of the circumferential edge, each configured as a defined blade, can be arranged around the circumference of the circumferential edge, distributed at equal angle distances. Here, in principle it is possible to also use a conventionally formed hob-peeling wheel, which is typically used to produce a tooth system, for machining the tip circle diameter in accordance with the invention.

The cutting output that is achieved during machining of the tip circle diameter in accordance with the invention can also be influenced by setting a specific speed of rotation ratio Wz/Ww, which is formed by dividing the speed of rotation Wz of the tool by the speed of rotation Ww of the workpiece. Here, speed of rotation ratios Wz/Ww of 1.1 to 10 have proven to be particularly well-suited for practice, in particular for machining internal tooth systems. Optimized removal performance can be achieved with a speed of rotation ratio of 1.1 to 5.

If the speed of rotation ratio is suitably selected, the hob-peeling machining of the tip circle diameter can take place with the workpiece and the tool running in the same direction. During same-direction hob peeling, the hob-peeling tool rotates about a first axis of rotation, and the workpiece rotates about a second axis of rotation, with the speed of rotation coupled to the rotation of the tool. A relative movement of the hob-peeling tool and the workpiece, oriented in the axial direction, is carried out simultaneously. For this purpose, the hob-peeling tool can be moved axially along its tool axis of rotation relative to the workpiece, and/or the workpiece can be moved along its workpiece axis of rotation relative to the tool, wherein the two axes of rotation are skewed relative to one another at an axis intersection angle during the hob-peeling process (see EP 2 537 616 A1).

It has proven to be particularly practical if the hob-peeling machining takes place in counterrotation, in other words if the tool and the workpiece rotate in opposite directions during the chip-removing machining.

The disk-shaped tool used according to the invention can consist, at least in the region of its cutting edge, of carbide or of high-speed steel produced by means of powder metallurgy.

In order to impart sufficient rigidity and stability to the tool, it can have a thickness Dz of at least 1 mm, wherein tool thicknesses Dz of 2-6 mm have proven to be particularly practical in practice.

A variant of the invention, in which the tip surfaces of the teeth of a tooth system machined by means of hob peeling according to the invention is coupled with the production of this tooth system on the corresponding gearwheel, has proven to be particularly advantageous from a technological and a practical point of view. For this purpose, according to the invention provision is made, in a first work step, of a gearwheel blank, on which the tooth system of the gearwheel is produced by means of hob peeling. Subsequently, the tip surface of the at least one tooth of the tooth system produced in this manner is machined according to the invention using the disk-shaped tool in a second step for the purpose of machining the tip circle diameter.

In the case of the variant mentioned in the preceding paragraph, it has proven to be particularly advantageous in terms of the quality of the work result if the hob-peeling tool used for producing the tooth system of the gearwheel from the gearwheel blank and the disk-shaped tool used for chip-removing machining of the tip surface according to the invention are jointly fastened to a tool holder, offset from one another in the axis direction of the tool axis of rotation, which holder can be configured in the manner of a bearing axle, for example. This arrangement makes it possible to complete both machining steps in a single chucking process. The joint placement of the two tools on a tool holder thereby allows maximum production precision values, since rechucking the tools or the workpiece between the work steps, accompanied by position deviations that are unavoidable in practice, is prevented in a simple manner. At the same time, this design also proves to be particularly effective from a machine technology point of view, because the same movement axes and setting axes of the machine are needed for production of the tooth system on the gearwheel blank, which takes place by means of hob peeling, as for machining of the tip surfaces of the teeth of the gearwheel, which also takes place, according to the invention, by means of hob peeling, but with a disk-shaped tool. In this manner, it is possible to carry out hob-peeling machining on the gearwheel blank, without additional effort, using an axis intersection angle that is optimally adapted to the corresponding machining task and differs from the axis intersection angle at which the hob-peeling machining of the tip surfaces of the teeth of the gearwheel previously produced from the gearwheel blank according to the invention is carried out.

In accordance with the above explanations, it is possible to produce gearwheels from a gearwheel blank, in a particularly simple manner, using a combination tool in which, according to the invention, a hob-peeling tool for producing a tooth system on a gearwheel blank and a disk-shaped tool for machining the tip surface of at least one tooth of the tooth system produced using the hob-peeling tool are arranged on a tool holder, at a distance from one another in the axis direction of the tool holder, with the tip circle diameters of the gearwheels having been machined separately, achieving a qualitatively optimized work result.

BRIEF DESCRIPTION OF THE DRAWINGS

In the following, the invention will be explained in greater detail using a drawing that shows an exemplary embodiment. The figures schematically show.

DETAILED DESCRIPTION OF THE PREFERRED EMBODIMENTS

Figure 1:
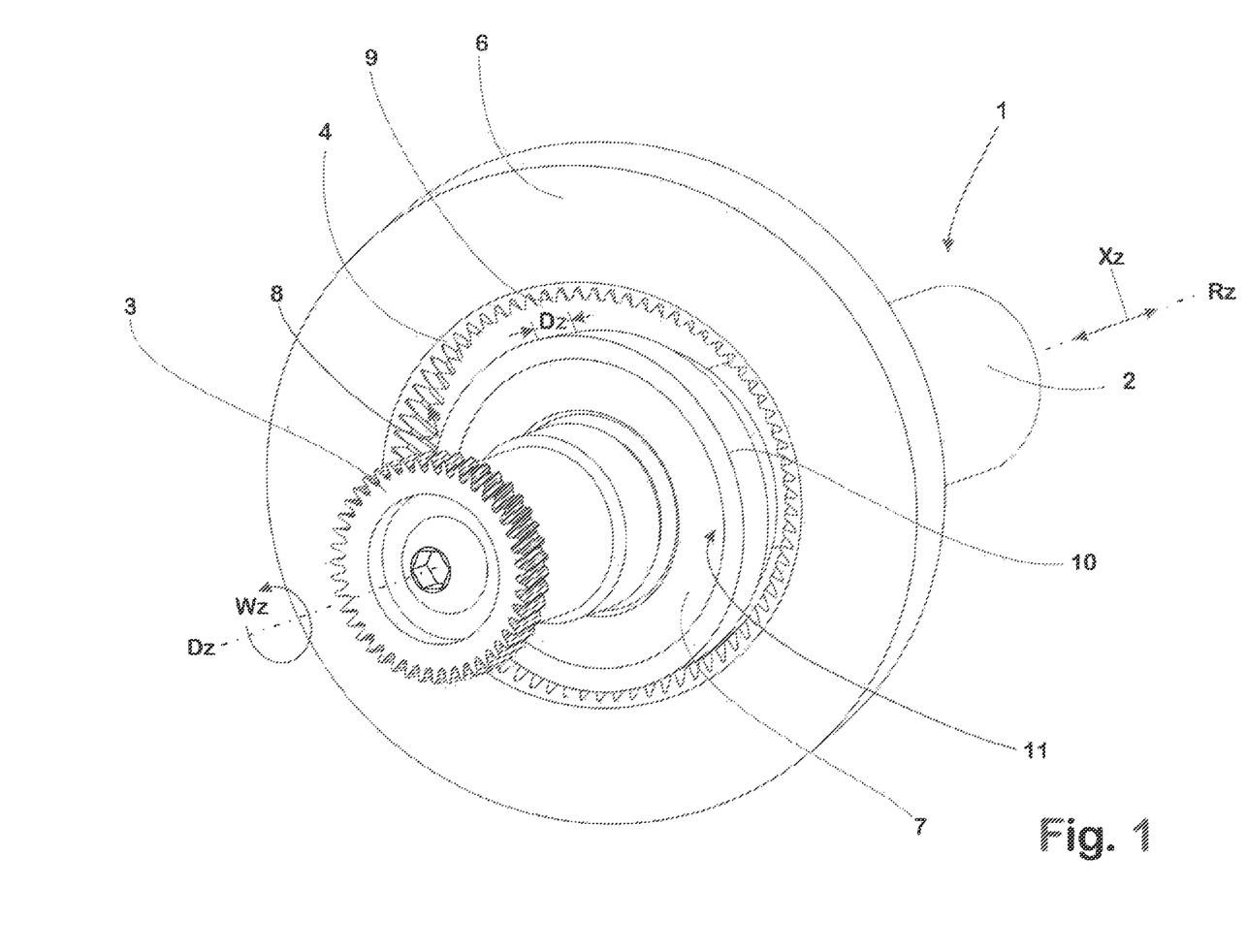
FIG. 1 a perspective view of a combination tool for producing an internal tooth system on a gearwheel blank and subsequent machining of the tip circle diameter of the internal tooth system.

The combination tool 1 comprises a tool holder 2, formed in the manner of a bearing axle, which is coupled to the rotary drive (not shown) of a conventional machine tool (also not shown) designed for hob-peeling machining, and which is driven to rotate about its axis of rotation Rz in this manner at a speed of rotation Wz.

Figure 2:
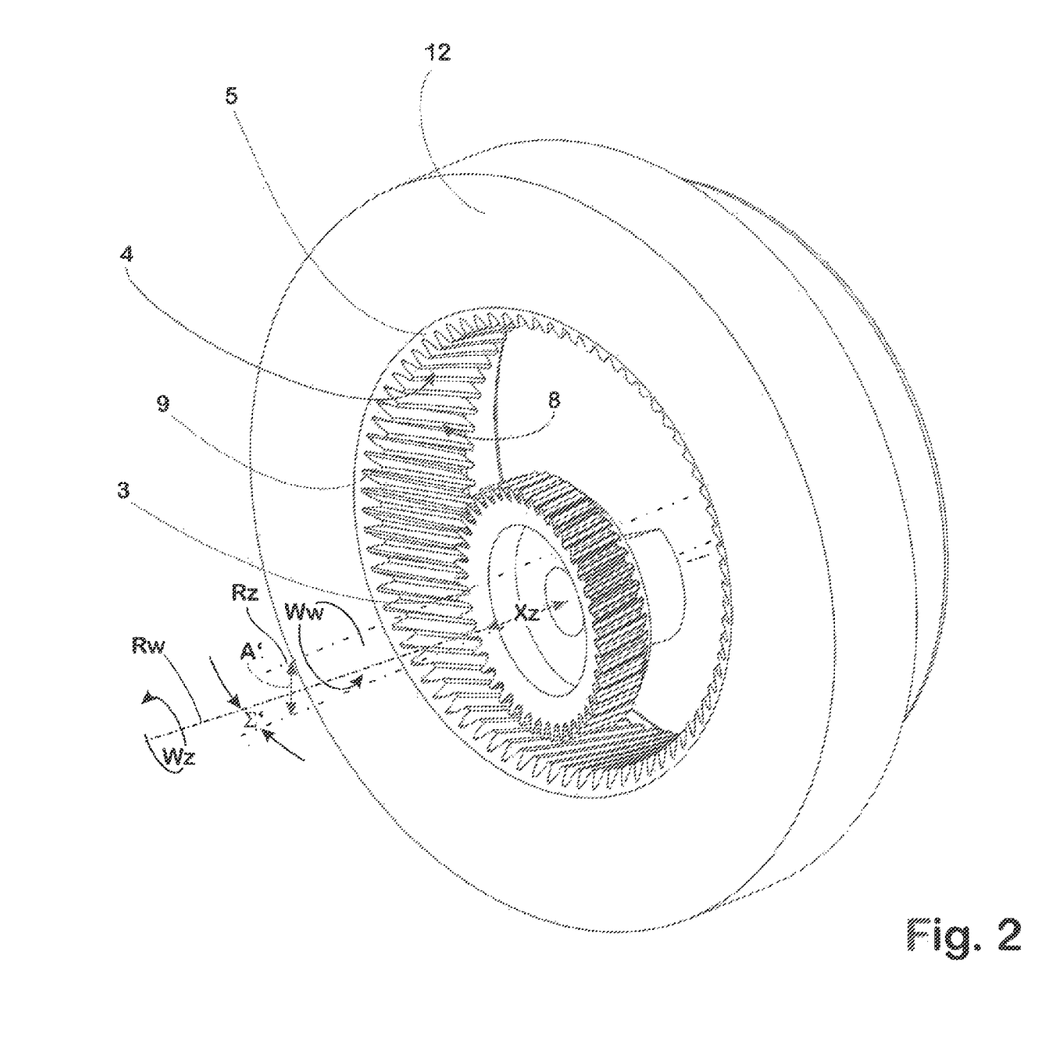
FIG. 2 a perspective view of a gearwheel-shaped hob-peeling tool, which is part of the combination tool according to FIG. 1, during machining of the gearwheel blank for producing the internal tooth system, in which the other components of the combination tool have been left out.

The tool holder 2 of the combination tool 1 bears a gearwheel-shaped hob-peeling wheel 3 at its front free end, which wheel is designed, in a conventional manner, for producing an internal tooth system 4 on a gearwheel 6, which is initially provided as a gearwheel blank 5 (FIG. 2).

In the axis direction Xz of the tool holder 2, offset relative to the hob-peeling wheel 3 in the direction of the chuck of the tool holder 2, a disk-shaped tool 7 is fastened to the tool holder 2 as a further element of the combination tool 1, which tool is oriented coaxial to the axis of rotation Rz of the tool holder 2 and has a thickness Dz of 6 mm, for example.

Figure 3:
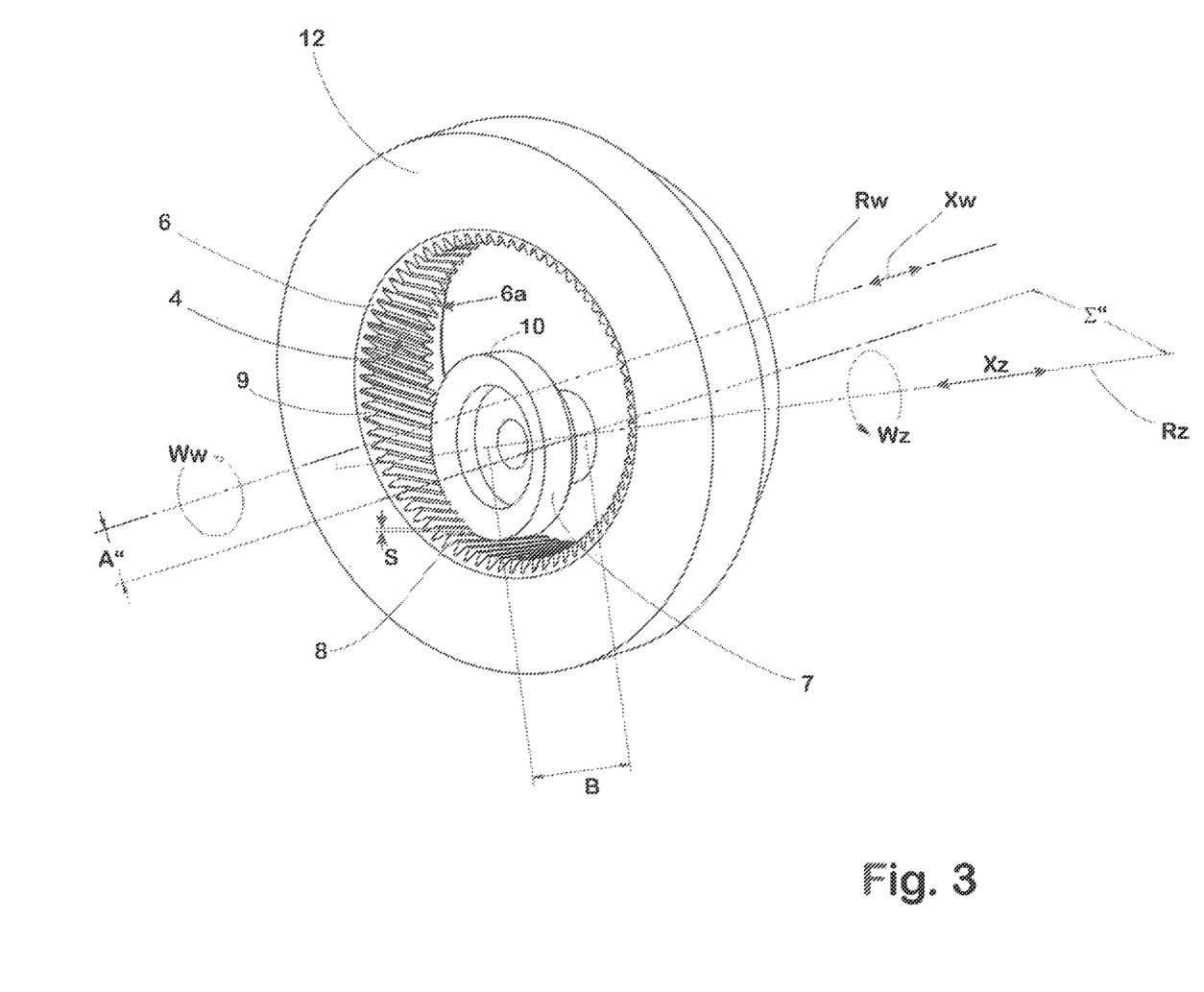
FIG. 3 a perspective view of a disk-shaped tool, which is part of the combination tool according to FIG. 1, during machining of the tip surfaces of the internal tooth system, in which the other components of the combination tool have been left out.

The disk-shaped tool 7 serves for machining the tip surfaces 8 of the teeth 9 of the internal tooth system 4 of the gearwheel 6, which were produced by the hob-peeling wheel 3. For this purpose, the tool 7 has a defined cutting edge 10, which runs around its front end face 11 relative to the hob-peeling wheel 3.

To produce the gearwheel 6, the gearwheel blank 5 is clamped into a workpiece chuck 12 of the machine tool (not shown here).

The gearwheel blank 5 is preferably provided without teeth, but can also be provided, in a manner known per se, with a pre-finished rough internal tooth system, which is now machined to finish it, by means of the hob-peeling wheel 3, by removing chips, in terms of the geometry of its teeth 9.

The gearwheel blank 5 to be provided with the internal tooth system 4 is driven to rotate, in a known manner, by means of a not shown rotary drive of the machine tool about a workpiece axis of rotation Rw, at a workpiece speed of rotation Ww, in the same direction as the rotation of the hob-peeling wheel 3. In this regard, the speed of rotation ratio Wz/Ww formed from the workpiece speed of rotation Ww and the tool speed of rotation Wz is 3:1, for example.

During the hob-peeling machining of the teeth 9 of the gearwheel blank 5 by means of the hob-peeling wheel 3, which now follows, the workpiece axis of rotation Rw is oriented at an axis intersection angle $\Sigma'$, which is 20°, for example, and at an axial distance A' with respect to the tool axis Rz. Accordingly, the hob-peeling wheel 3 is at first situated, at the beginning of machining, in the axial direction, on the side of the gearwheel blank 5 that is assigned to the chuck of the tool holder 2, outside of the internal tooth system 4. The gearwheel blank 5 is then displaced in the axial direction Xw, along the workpiece axis Rw, relative to the hob-peeling wheel 3, which is at rest relative to the axis direction of its axis of rotation Rz so that the internal tooth system 4 is moved along the hob-peeling wheel 3 until the hob-peeling wheel 3 exits from the internal tooth system 4 on the opposite side of the gearwheel blank 5.

Because of the relative movement that occurs as the result of the axis intersection angle $\Sigma'$ and the axial movement in the axis direction Xz between the teeth 9 of the hob-peeling wheel 3 and the internal tooth system 4 that come into contact with one another, chip removal takes place during this process in a manner known per se, by means of which removal the teeth 9 of the internal tooth system 4 are shaped in final form in the region of their tooth flanks. The hob-peeling machining of the internal tooth system 4 using the hob-peeling wheel 3 is continued until all teeth 9 of the internal tooth system 4 have been shaped in final form in accordance with the default values that apply to this work step.

After production of the internal tooth system 4 of the gearwheel 6 by means of the hob-peeling wheel 3 has been completed, the tool holder 2, with the hob-peeling wheel 3 and the disk-shaped tool 7, is oriented by means of a movement of the tool holder 2 and/or of the gearwheel 6 in the axial direction Xz such that the tool 7 is arranged close to the end face 6a of the gearwheel 6 that faces the chuck of the tool holder 2.

Furthermore, the tool holder 2 is pivoted in such a manner that the tool axis of rotation Rz is oriented with respect to the workpiece axis of rotation Rw at an axis intersection angle $\Sigma''$ that deviates from the axis intersection angle $\Sigma'$ and is 10°, for example. Likewise, an axial distance A" is set between the workpiece axis of rotation Rw and the tool axis of rotation Rz, which distance is dimensioned in such a manner that the cutting edge 10 of the disk-shaped tool 7 is arranged offset, in the radial direction, by the desired chip depth S relative to the tip surfaces 8 of the teeth 9 of the internal tooth system 4, in the direction of the outside circumference of the gearwheel 6.

For the subsequent machining of the tip circle diameter, the disk-shaped tool 7 also rotates in the same direction as the direction of rotation Ww of the gearwheel 6, at a speed of rotation Wz, about its tool axis Rz. The speed of rotation ratio Wz/Ww formed from the workpiece speed of rotation Ww and the tool speed of rotation Wz is now 2:1, for example.

The disk-shaped tool 7 is moved through the gearwheel 6 in the axial direction Xz over the width B of the tip surfaces 8 until its cutting edge 10 has entirely swept over the tip surfaces 8 of the teeth 9, and has removed a chip having the thickness S from the tip surfaces 8 while doing so. This process is repeated until all tip surfaces 8 of the teeth 9 of the internal tooth system 4 have been machined in a corresponding manner, and the required tip circle diameter of the internal tooth system 4 has been achieved.

Figure 4:
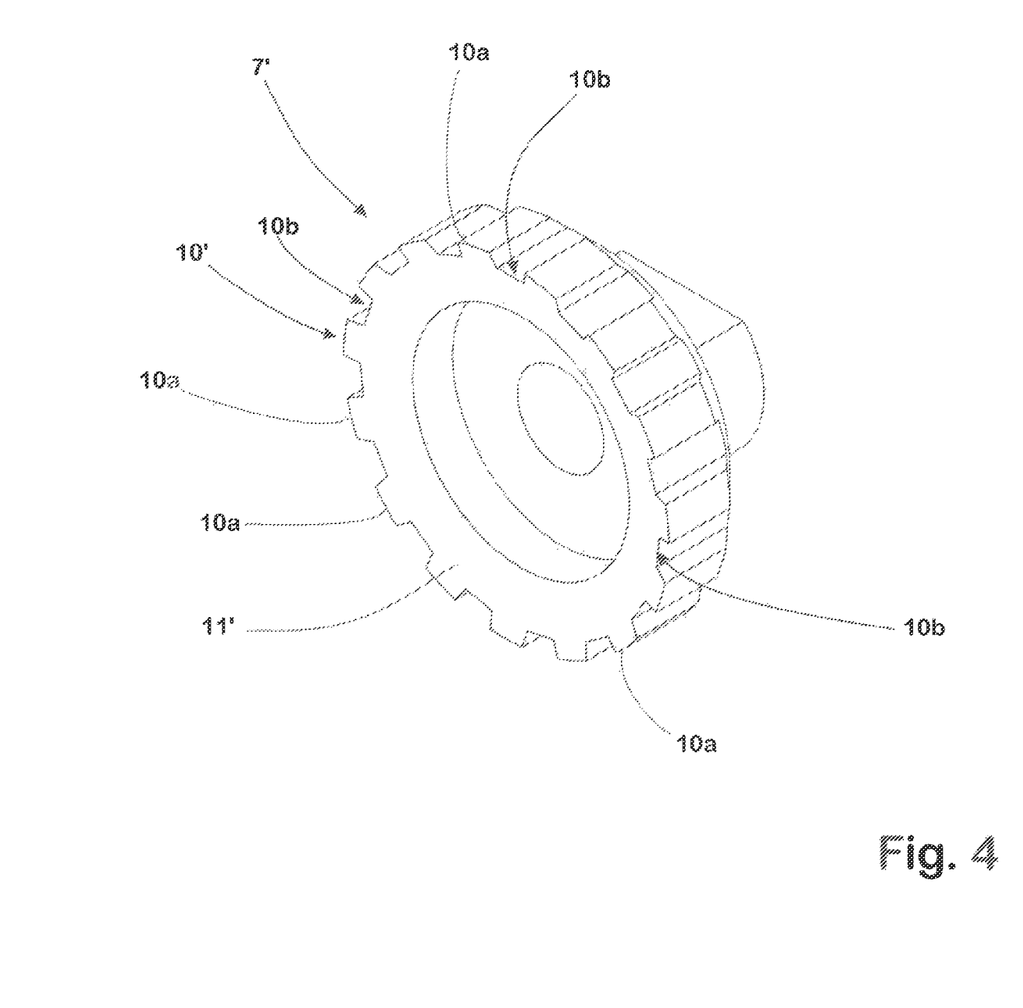
FIG. 4 a perspective view of an alternative design of the disk-shaped tool according to FIG. 3.

In FIG. 4, a disk-shaped tool 7' is shown as a variant of the disk-shaped tool 7 used, according to the invention, for machining the tip circle diameter; its cutting edge 10', which runs around its front end face 11', is segmented such that cutting edge segments 10a follow free spaces 10b at regular intervals and regular angle distances. If the disk-shaped tool 7' is mounted on the tool holder 2 of the combination tool 1 in place of the disk-shaped tool 7 and used for machining the tip circle diameter in the manner described above, then only the tip surfaces 8 of the teeth 9 of the internal tooth system 4 are machined, by removing chips, which surfaces are arranged in accordance with the distances between the cutting edge segments 10, taking into consideration the corresponding speed of rotation ratio Wz/Ww. In this way, machining of the tip circle diameter can be restricted to only every other or every third tooth 9 of the internal tooth system 4, for example, while the other teeth 9 remain unshortened.

REFERENCE SYMBOLS 1 combination tool
2 tool holder of the combination tool 1
3 gearwheel-shaped hob-peeling wheel
4 internal tooth system of the gearwheel 6
5 gearwheel blank
6 gearwheel
6a end face of the gearwheel 6, facing the chuck of the tool holder 2
7, 7' disk-shaped tool
8 tip surfaces of the teeth 9 of the internal tooth system 4
9 teeth of the internal tooth system 4
10, 10' cutting edge of the tool 7, 7'
10a cutting edge segments of the disk-shaped tool 7'
10b free spaces of the cutting edge 10' of the disk-shaped tool 7'
11, 11' front end face of the disk-shaped tool 7, 7'
12 workpiece chuck
A', A" axial distance
B width of the tip surfaces 8
Dz thickness of the disk-shaped tool
Rw workpiece axis of rotation
Rz axis of rotation Rz of the combination tool 1 and of its hob-peeling wheel 3 as well as of the disk-shaped tool 7
S chip depth
Ww workpiece speed of rotation
Wz respective speeds of rotation of the combination tool 1 and of its hob-peeling wheel 3 as well as of the disk-shaped tool 7
Xz axis direction of the tool axis of rotation Rz
Xw axis direction of the workpiece axis of rotation Rw
$\Sigma'$, $\Sigma''$, axis intersection angle

The invention claimed is:

1. A method for machining a gearwheel comprising:
providing a workpiece in the form of a gearwheel comprising a tooth system, the tooth system comprising a plurality of teeth, each tooth having a tip surface partially defining a tip circle diameter of the tooth system;
rotating the gearwheel about a workpiece axis of rotation (Rw); and
machining the tip surface of at least one tooth of the plurality of teeth of the tooth system by removing chips from the tip surface of the at least one tooth using a tool that rotates about a tool axis of rotation (Rz) oriented at an axial distance (A', A") from the workpiece axis of rotation (Rw),
wherein the tool is disk-shaped and machines the tip surface of the at least one tooth using at least one partial segment of a circumferential edge of the tool that is configured as a defined blade,
during the machining, the tool is moved relative to the gearwheel and/or the gearwheel is moved relative to the tool, such that the tool sweeps over the tip surface of the at least one tooth,
the machining of the tip surface of the at least one tooth changes the tip circle diameter by removing a portion of the tip surface of the at least one tooth, and
the tool axis of rotation (Rz) is oriented, with respect to the workpiece axis of rotation (Rw), at an axis intersection angle ($\Sigma''$) of 5° to 40°.

2. The method according to claim 1, wherein the gearwheel comprises a first end face and a second end face, and the tool is moved axially along the tool axis of rotation (Rz) from a starting position, which is assigned to the first end face of the gearwheel toward the second end face of the gearwheel.

3. The method according to claim 1, wherein the disk-shaped tool comprises a first end face and a second end face, and the gearwheel is moved axially along the workpiece axis of rotation (Rw) from a starting position, which is assigned to the first end face of the disk-shaped tool toward the second end face of the disk-shaped tool.

4. The method according to claim 1, wherein the axis intersection angle ($\Sigma''$) is at least 10°.

5. The method according to claim 1, wherein the axis intersection angle ($\Sigma''$) is at most 35°.

6. The method according to claim 1, wherein an entire circumferential length of the circumferential edge of the tool is configured as a defined blade.

7. The method according to claim 1, wherein the circumferential edge comprises a plurality of partial segments, each configured as a defined blade, and the partial segments are distributed over a circumference of the circumferential edge.

8. The method according to claim 1, wherein during the machining, a speed of rotation ratio, Wz/Ww, where Wz is a speed of rotation of the tool and Ww is a speed of rotation of the workpiece, is 1.1-10.

9. The method according to claim 8, wherein the speed of rotation ratio, Wz/Ww, is 1.1-5.

10. The method according to claim 1, wherein the tool and the workpiece rotate in the same direction during the machining.

11. The method according to claim 1, wherein the tool has a thickness (Dz), measured axis-parallel to the tool axis of rotation (Rz), of at least 1 mm.

12. The method according to claim 1, wherein the provision of the gearwheel comprises hob-peeling machining a gearwheel blank to form the tooth system.

13. The method according to claim 12, wherein a hob-peeling tool for the hob-peeling machining of the gearwheel blank to form the tooth system and the tool for the machining of the tip surface of the at least one tooth are jointly attached to a tool holder, and are offset from one another in an axis direction (Xz) of the tool axis of rotation (Rz).

14. The method according to claim 12, wherein an axis intersection angle ($\Sigma'$) of the tool axis of rotation (Rz) with respect to the workpiece axis of rotation (Rw) set during the hob-peeling machining differs from the axis intersection angle ($\Sigma''$) at which the tool axis of rotation (Rz) is oriented with respect to workpiece axis of rotation (Rw) during the machining of the tip surface of the at least one tooth using the tool.

\* \* \* \* \*